United States Patent
Tran et al.

(10) Patent No.: US 7,378,366 B2
(45) Date of Patent: May 27, 2008

(54) MANGANESE-BASED OXIDATION CATALYST

(75) Inventors: Pascaline Harrison Tran, Holmdel, NJ (US); Howard Furbeck, Hamilton, NJ (US); Gerard D. Lapadula, Piscataway, NJ (US)

(73) Assignee: BASF Catalysts LLC, Iselin, NJ (US)

( * ) Notice: Subject to any disclaimer, the term of this patent is extended or adjusted under 35 U.S.C. 154(b) by 0 days.

(21) Appl. No.: 11/554,781

(22) Filed: Oct. 31, 2006

(65) Prior Publication Data

US 2007/0072766 A1   Mar. 29, 2007

Related U.S. Application Data

(63) Continuation of application No. 10/752,260, filed on Jan. 6, 2004, now Pat. No. 7,208,128.

(51) Int. Cl.
*B01J 27/187* (2006.01)
(52) U.S. Cl. .................................................. 502/208
(58) Field of Classification Search .................. 502/208
See application file for complete search history.

(56) References Cited

U.S. PATENT DOCUMENTS

| | | | |
|---|---|---|---|
| 4,243,556 A | | 1/1981 | Blanton, Jr. |
| 4,370,259 A | * | 1/1983 | Eastman et al. ............. 502/208 |
| 5,871,347 A | * | 2/1999 | Chen et al. .................... 432/72 |
| 5,880,059 A | | 3/1999 | Tsyrulnikov et al. |
| 5,891,411 A | * | 4/1999 | Gribbon .................... 423/245.3 |
| 6,193,504 B1 | * | 2/2001 | Chen et al. .................... 432/72 |
| 2003/0092568 A1 | | 5/2003 | Morita et al. |
| 2003/0170160 A1 | | 9/2003 | Morita et al. |
| 2004/0132615 A1 | * | 7/2004 | Fisher et al. ................. 502/324 |

FOREIGN PATENT DOCUMENTS

| DE | 3726510 | * | 2/1989 |
|---|---|---|---|
| DE | 277021 | * | 3/1990 |
| WO | WO 02/40151 | * | 5/2002 |

\* cited by examiner

*Primary Examiner*—Wayne A. Langel
(74) *Attorney, Agent, or Firm*—Melanie L. Brown; Scott S. Servilla; Brian Stegman

(57) ABSTRACT

A catalyst for the oxidation of volatile organic compounds and carbon monoxide comprising manganese and alumina, such catalyst having been impregnated with a phosphorus compound. The presence of the phosphorus compound results in a significant oxidative conversion of both the volatile organic compounds and the carbon monoxide. The catalyst is especially useful for treating gaseous streams that emanate from industrial sources, such as wood pulp manufacturing plants. The manganese portion of the catalyst is preferably comprised of manganese compounds comprising a defect non-stoichiometric manganese oxide of the type $\beta$-$Mn_3O_{4+x}$, wherein x has the value of $0.1 \leq x \leq 0.25$ in respect to about 80 to about 95% of all manganese atoms, and manganese aluminate in respect to the balance of the manganese atoms. The alumina portion of the catalyst is preferably comprised of high temperature forms of alumina of the type comprising $\alpha$-$Al_2O_3$ and $(\alpha+\delta+\theta)$-$Al_2O_3$.

11 Claims, 1 Drawing Sheet

Comparison of CO Activity for Manganese-Based Oxidation Catalyst With and Without P

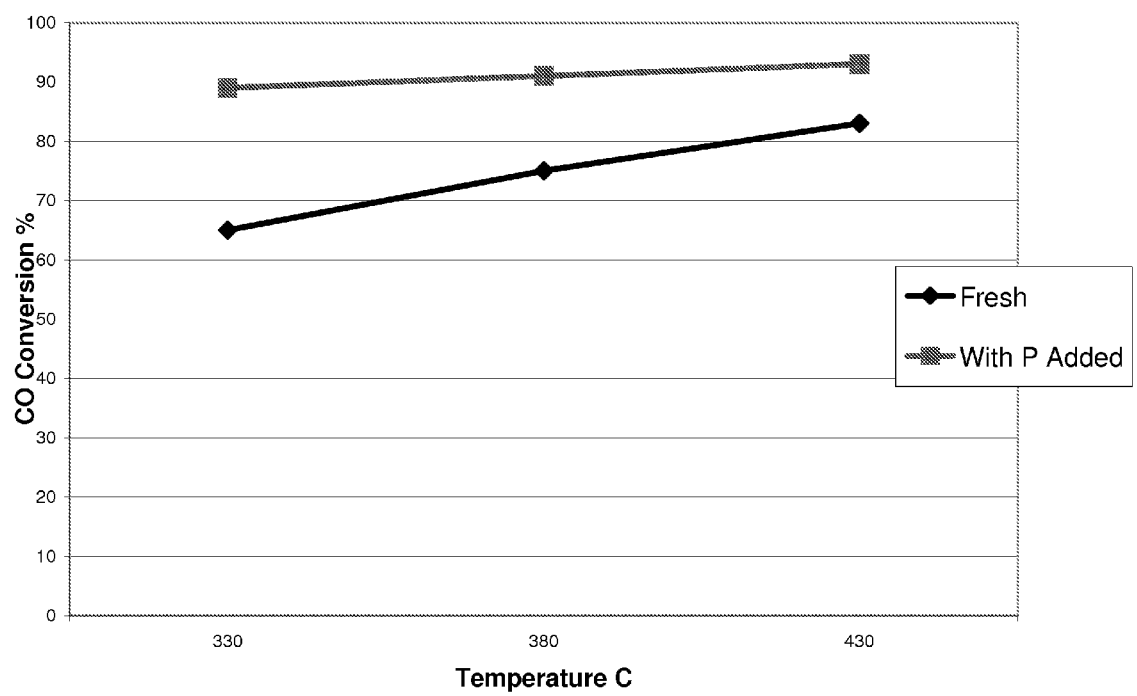

MANGANESE-BASED OXIDATION CATALYST

CROSS-REFERENCE TO RELATED APPLICATIONS

This application is a continuation of U.S. Ser. No. 10/752,260 filed Jan. 6, 2004 now U.S. Pat. 7,208,128, the contents of which are incorporated herein in their entirety.

FIELD OF THE INVENTION

The invention relates to a manganese-based oxidation catalyst for the oxidative destruction of gaseous volatile organic compounds ("VOCs") and carbon monoxide emissions. More particularly, the invention pertains to a catalyst comprising manganese and alumina, which catalyst has been impregnated with a phosphorus compound and a process for the destruction of VOC and carbon monoxide emissions using the phosphorous compound-impregnated manganese-alumina oxidation catalyst of the invention.

BACKGROUND OF THE INVENTION

A variety of commercial and industrial establishments emit air streams laden with VOCs and carbon monoxide that frequently are vented directly into the atmosphere with little or no treatment thereof prior to discharge from the source. However, federal, state and local environmental regulations now mandate that such air streams be treated to reduce the level of VOCs and carbon monoxide before the stream is emitted into the atmosphere.

One industry that is prone to the emission of VOCs and carbon monoxide is the wood industry. The manufacture of various wood products such as fiberboard, particleboard, plywood, wood pulp, etc., typically entails processing under elevated temperatures to achieve desired properties and characteristics for the wood products. The wood product selected for drying is often treated with chemicals, binders, varnishes, resins, adhesives, etc., prior to and during the process of drying. During the drying process, VOCs and carbon monoxide are emitted into the air stream used for the drying process and such pollutants must be removed or destroyed prior to discharge into the atmosphere.

In typical prior art processes, the air stream laden with the VOCs and carbon monoxide is treated in a regenerative catalytic oxidizer containing a catalyst that will reduce the level of such pollutants by oxidative conversion of the pollutants into water and carbon dioxide. Prior art catalysts include precious metal components such as platinum, palladium, rhodium, iridium and ruthenium; metal components such as vanadium copper, manganese, cerium and chromium as well as metal oxide catalysts such as manganese oxide or chromium oxide, and combinations of the foregoing metal and/or metal oxide catalysts.

Manganese-based, i.e., manganese-alumina, oxidation catalysts used for the oxidative destruction of VOCs and carbon monoxide are well known in the prior art. Such catalysts are relatively inexpensive in comparison to the metal catalyst mentioned above and exhibit a fair degree of activity in respect to the oxidative destruction of VOCs and carbon monoxide. A particularly useful manganese-alumina oxidation catalyst is that described in U.S. Pat. No. 5,880,059, which is incorporated by reference herein in its entirety. The manganese-alumina oxidation catalyst described in the '059 patent is available commercially and may be purchased from a source such as WRI Inc. or Elim A1 Industries, Inc. The catalyst described in the '059 patent exhibits excellent activity in respect to oxidative destruction of VOCs, but its activity in respect to the oxidative conversion of carbon monoxide to carbon dioxide is only fair.

OBJECTS OF THE INVENTION

It is an object of the invention to provide a relatively inexpensive manganese-based, i.e., manganese-alumina, oxidation catalyst that exhibits excellent activity in respect to the oxidative destruction of both VOCs and carbon monoxide present in air streams emitted from commercial and industrial sources, particularly the wood products industry.

It is a further object of the invention to provide a process for the treatment of air streams contaminated with VOCs and carbon monoxide using such manganese-based oxidation catalyst such that the content of the VOCs and carbon monoxide in the treated air stream will be well within the limits permitted by current and anticipated future federal, state and local environmental regulations.

The foregoing objects and other objects of the invention have been met by the catalysts and the processes of the invention, which have been described in greater detail hereinbelow.

BRIEF DESCRIPTION OF THE DRAWING

A graphic comparison of the carbon monoxide activity for a manganese-based oxidation catalyst with and without the phosphorous compound is shown in the drawing.

DETAILED DESCRIPTION OF THE INVENTION

The catalyst of the invention for the oxidation of volatile organic compounds and carbon monoxide comprises manganese and alumina, such catalyst having been impregnated with a phosphorus compound.

Preferably, the manganese portion of the catalyst is comprised of manganese compounds comprising a defect non-stoichiometric manganese oxide of the type $\beta$-$Mn_3O_{4+x}$, wherein x has the value of $0.1 \leq x \leq 0.25$ in respect to about 80 to about 95% of all manganese atoms, and manganese aluminate in respect to the balance of the manganese atoms. It is also preferred that the manganese compounds comprise about 2.7 to about 11.5 mass % expressed as elementary manganese, and the balance of the catalyst comprises alumina.

Preferably, the alumina portion of the catalyst is comprised of high temperature forms of alumina of the type comprising $\alpha$-$Al_2O_3$ and $(\alpha+\delta+\theta)$-$Al_2O_3$. It is also preferred that the alumina portion of the catalyst comprises $\alpha$-$Al_2O_3$ in the amount of about 72 to about 95 mass %, and the balance of the $Al_2O_3$ is present in the form of $(\delta+\theta)$-$Al_2O_3$. It is additionally preferred that the manganese portion of the catalyst comprises a monolith defect structure having a particle size of about 50 to about 70 Å. Preferably, the alumina portion of the catalyst comprise particles of irregular spatial configuration and the manganese portion of the catalyst comprises non-stoichiometric manganese oxide present in the form of agglomerated smaller particles fixed on the surface of the alumina particles based on a solid solution of manganese aluminate.

The catalyst may be readily prepared by the processes disclosed in the '059 patent or it may be obtained by purchase from a commercial source such as that indicated above. In general, the catalyst is utilized in the form of extrudates, rings, saddles, pellets, etc.

After its preparation or purchase from a commercial source, the manganese-alumina catalyst is impregnated with a phosphorus compound such that the amount of phosphorous compound will, after calcination, be in the range of about 0.05 to about 5 wt. %, preferably 0.05 to 2 wt. %, based on the weight of the calcined catalyst. Preferred phosphorous compounds include phosphoric acid and other soluble phosphorous salts.

The catalyst of the '059 patent is conveniently purchased in the form of Raschig rings having a diameter of about 14 mm and a height of about 14 mm. The selected phosphorous compound is dissolved in a suitable solvent, e.g., water, to provide a solution having a concentration in the range of about 0.05 to about 5.0 wt. % of the phosphorous compound. The Raschig rings are immersed in the solution for a period of about 10 to about 30 minutes, dried at a temperature of about 90 to about 150° C. for about 10 to about 16 hours and thereafter calcined at a temperature of about 450 to about 600° C. for about 2 to about 6 hours.

The process for the oxidative destruction of the VOCs and carbon monoxide in an air stream containing such pollutants is relatively straight-forward. The catalyst of the invention is provided as a bed in a typical regenerative catalytic oxidizer; typically, the catalyst bed will have a height of about 4 to about 12 inches and a diameter of about 3 to about 6 inches. The air stream to be treated will typically contain about 30 to about 100 ppm VOCs and about 5 to about 100 ppm carbon monoxide and will typically contact the bed at the space velocity of 5000 to about $8000^{-1/hr}$. The oxidation reaction is exothermic in nature and the rate of admission of the polluted air stream into the catalyst bed should be controlled such that a temperature in the range of about 300 to about 550° C. is maintained throughout the treatment process.

The following nonlimiting examples shall serve to illustrate the various embodiments of the invention. Unless otherwise indicated, all amounts and percentages are on a weight basis.

EXAMPLE 1

Manganese-alumina Raschig rings having a dimension of 14 mm×14 mm were purchased from a commercial source. A quantity of these rings was set aside to be used as is for comparative purposes, while an equal quantity of these rings were impregnated with a phosphorous compound as follows:

Phosphoric acid in the amount of 0.85 g was mixed with 389 g of distilled water. The Raschig rings were placed in a container and the phosphoric acid solution was poured into the container. The solution and the rings were gently mixed until all of the solution had been absorbed. The impregnated rings were then poured into a drying dish and thereafter dried at 120° C. for 16 hours. The dried rings were then placed in a calcining tray and calcined at 550° C. for 2 hours. The resultant rings were then evaluated against the original, non-impregnated rings as set forth below.

EXAMPLE 2

800 g of the original, non-impregnated rings were placed in a reactor such that the catalyst bed had a volume of about 4×6 inches. A gas stream consisting of 250 ppm carbon monoxide, 10% oxygen and the balance being nitrogen was admitted into the reactor at the rate of $10{,}000^{-1/hr}$ while maintaining the catalyst bed at a temperature range of 330-430° C. The outlet stream was then analyzed for ppm carbon monoxide and ppm carbon dioxide and a determination was made of the percent conversion of the carbon monoxide into carbon dioxide versus the temperature of the catalyst bed. The results are graphically shown in the FIGURE.

EXAMPLE 3

Example 2 was repeated using 800 g of the impregnated rings prepared in accordance with Example 1. The results of this evaluation are graphically shown in the FIGURE. As may be seen from the FIGURE, the percentage of conversion of carbon monoxide into carbon dioxide when using the impregnated manganese-alumina catalyst of the invention was dramatically higher than that obtained using the original, non-impregnated manganese-alumina catalyst.

What is claimed is:

1. A catalyst for the oxidation of volatile organic compounds and carbon monoxide comprising manganese and alumina, said catalyst having been impregnated with a phosphorus compound, wherein the catalyst is free of precious metal components and exhibits activity in the destruction of VOCs and carbon monoxide present in air streams emitted from industrial sources and is operative to convert at least about 90% of the carbon monoxide to carbon dioxide in an air stream containing about 5 to 100 ppm carbon monoxide at a space velocity in the range of about 5000 to about $10{,}000^{-1/hr}$ and a temperature in the range of about 330° C. to about 430° C.

2. The catalyst of claim 1 wherein the manganese portion of the catalyst is comprised of manganese compounds comprising a defect non-stoichiometric manganese oxide of the type $\beta$-$Mn_3O_{4+x}$, wherein x has the value of $0.1 \leq x \leq 0.25$ in respect to about 80 to about 95% of all manganese atoms, and manganese aluminate in respect to the balance of the manganese atoms.

3. The catalyst of claim 2 wherein the manganese compounds comprise about 2.7 to about 11.5 mass % expressed as elementary manganese, and the balance of the catalyst comprises alumina.

4. The catalyst of claim 1 wherein the alumina portion of the catalyst is comprised of high temperature forms of alumina comprising $\alpha$-$Al_2O_3$ and $(\alpha+\delta+\theta)$-$Al_2O_3$.

5. The catalyst of claim 4 wherein the alumina portion of the catalyst comprises $\alpha$-$Al_2O_3$ in the amount of about 72 to about 95 mass %, and the balance of the $Al_2O_3$ is present in the form of $(\delta+\theta)$-$Al_2O_3$.

6. The catalyst of claim 1 wherein the manganese portion of the catalyst comprises a monolith defect structure having a particle size of about 50 to about 70 Å.

7. The catalyst of claim 1 wherein the alumina portion of the catalyst comprise particles of irregular spatial configuration and the manganese portion of the catalyst comprises non-stoichiometric manganese oxide present in the form of agglomerated smaller particles fixed on the surface of the alumina particles based on a solid solution of manganese aluminate.

8. The catalyst of claim 1 wherein the phosphorus compound comprises $H_3PO_4$.

9. The catalyst of claim 1 wherein the phosphorus compound comprises $P_2O_5$.

10. The catalyst of claim 1 wherein the impregnation of the catalyst is carried out with an aqueous solution containing the phosphorous compound in a concentration of about 0.05 to about 5 wt. %, based on the weight of the catalyst.

11. The catalyst of claim 1 employed in the form of Raschig rings.

* * * * *